United States Patent [19]

Bauerle et al.

[11] Patent Number: 5,666,932
[45] Date of Patent: Sep. 16, 1997

[54] EGR VALVE MAINTENANCE METHOD

[75] Inventors: Paul Alan Bauerle, Dewitt; Robert Francis Semrau, Ovid; John Norman Stockbridge, Lansing, all of Mich.

[73] Assignee: General Motors Corporation, Detroit, Mich.

[21] Appl. No.: 636,081

[22] Filed: Apr. 22, 1996

[51] Int. Cl.⁶ .................................................. F02M 25/07
[52] U.S. Cl. ........................................................ 123/571
[58] Field of Search ................................... 123/568, 569, 123/570, 571

[56] References Cited

U.S. PATENT DOCUMENTS

| | | | |
|---|---|---|---|
| 4,364,368 | 12/1982 | Blanchette | 123/568 |
| 4,378,777 | 4/1983 | Iida et al. | 123/571 |
| 4,428,355 | 1/1984 | Yokooku | 123/571 |
| 5,027,781 | 7/1991 | Lewis | 123/568 |
| 5,508,926 | 4/1996 | Wade | 123/571 |
| 5,546,915 | 8/1996 | Isobe | 123/571 |
| 5,579,743 | 12/1996 | Kadowaki | 123/571 |

*Primary Examiner*—Willis R. Wolfe
*Attorney, Agent, or Firm*—Michael J. Bridges

[57] ABSTRACT

A maintenance method for periodically maintaining the operating condition of an exhaust gas recirculation valve for controlling recirculation of internal combustion engine exhaust gas from an exhaust gas path to an engine intake air path in which the valve is periodically driven to a maximum open position and then back to an initial position, such as a closed position when engine operating conditions are such that there is no driveability or emissions penalty associated with such valve maintenance and when sufficient battery drive voltage is available to drive the valve as required for maintenance thereof.

6 Claims, 4 Drawing Sheets

5,666,932

EGR VALVE MAINTENANCE METHOD

FIELD OF THE INVENTION

This invention relates to automotive control valves and, more particularly, to periodic unintrusive maintenance of exhaust gas recirculation valves.

BACKGROUND OF THE INVENTION

Exhaust gas recirculation EGR valves are generally applied in automotive internal combustion engine emission controls for metering exhaust gas for combination with a "clean" air charge into the engine. EGR valves typically include an orifice and a pintle on an end of shaft driven by an electromagnetic actuator acting against the force of a return spring. The EGR valve is positioned in the exhaust gas recirculation flow path so that all recirculated exhaust gas must pass through the valve orifice. In its normally closed position, the pintle is sealably engaged with the valve orifice to block exhaust gas flow through the orifice. The pintle must securely seal the orifice when closed to ensure that no exhaust gas flows through the orifice. Even a small flow of exhaust gas through the orifice can sufficiently dilute the engine fresh air charge to alter engine operation and potentially reduce engine performance stability and potentially increase engine emissions. The position of the EGR valve is precisely controlled so that exactly the correct dilution of the fresh air charge is maintained under all conditions. Too much or too little dilution can perceptibly disrupt engine stability and can increase engine emissions.

The recirculated engine exhaust gas, laden with contaminants, comes in contact with many moving parts within the EGR valve including the valve orifice, pintle and shaft. Contaminants may be deposited on such moving parts, and may accumulate over time. The contaminants may accumulate to a level affecting EGR valve performance. For example, buildup of contaminants on the shaft can reduce clearance between the shaft and the bore (or bearing) through which the shaft travels and can eventually contact the bore, increasing the frictional load on the shaft which reduces dynamic performance and can result in restriction in valve motion. Additionally, build-up on the pintle or about the orifice can prevent a sealed engagement between the pintle and the orifice. The contamination can increase a difference between actual and desired dilution of the engine fresh air charge, potentially increasing engine emissions and decreasing engine performance.

Concern about contaminant build-up on EGR valves has lead to such remedial measures as design and application of complex, expensive EGR valve apparatus, and intrusive EGR valve maintenance procedures. The maintenance procedures include periodic cycling of the EGR valve pintle and shaft along its range of motion during engine operation to scrape off the contaminant build-up or to knock contaminants loose. Such cycling may reduce contaminant build-up but includes an emissions and performance penalty by driving a dilution level away from a desired level simply to provide for EGR valve maintenance. Engine emissions may increase and the engine may perform perceptibly below operator expectation.

It would therefore be desirable to maintain the EGR valve in a condition supporting precision EGR control with an unintrusive valve maintenance method having no associated engine performance or emissions penalty.

SUMMARY OF THE INVENTION

The present invention is directed to a valve maintenance method providing for periodic valve cleaning operations having no associated emissions or performance penalty.

More specifically, a set of maintenance conditions are identified. Such conditions support EGR valve maintenance procedures with no emissions or driveability penalty. When such conditions are identified as being present and while such conditions persist, the EGR valve is actuated rapidly from an initial position to substantially a wide open position with a significant degree of electrical drive force. After a period of time, the valve is rapidly returned to a control position, such as a closed position. The rapid actuation of the valve operates to jar or shear the contaminant build-up so as to reduce such buildup. Such provides for substantially unrestricted movement of the pintle and shaft and for a sealed engagement between the pintle and the orifice. An engine startup period is identified as characterized by conditions well-suited to the EGR valve maintenance operations of this invention. The startup period is the brief operating period between the time of manual application of ignition power to startup an engine controller and the time of cranking of the engine, which may include a first few engine cranking events. In such startup period, the engine is not yet operating to generate any significant exhaust gasses, so no dilution results from such maintenance operations, and therefore the maintenance operations include no performance or emissions penalty. Any determination that the engine is producing significant emissions, such as passage of a predetermined number of engine cylinder events, will result in an immediate termination of the EGR valve maintenance operations. Still further, the maintenance operations are not carried out if there is any indication that drive voltage may be in short supply relative to the drive voltage likely to be required for engine startup. Engine startup reliability, like engine emissions and stability, is therefore preserved, while maintaining the EGR valve in condition to support precise dilution control.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
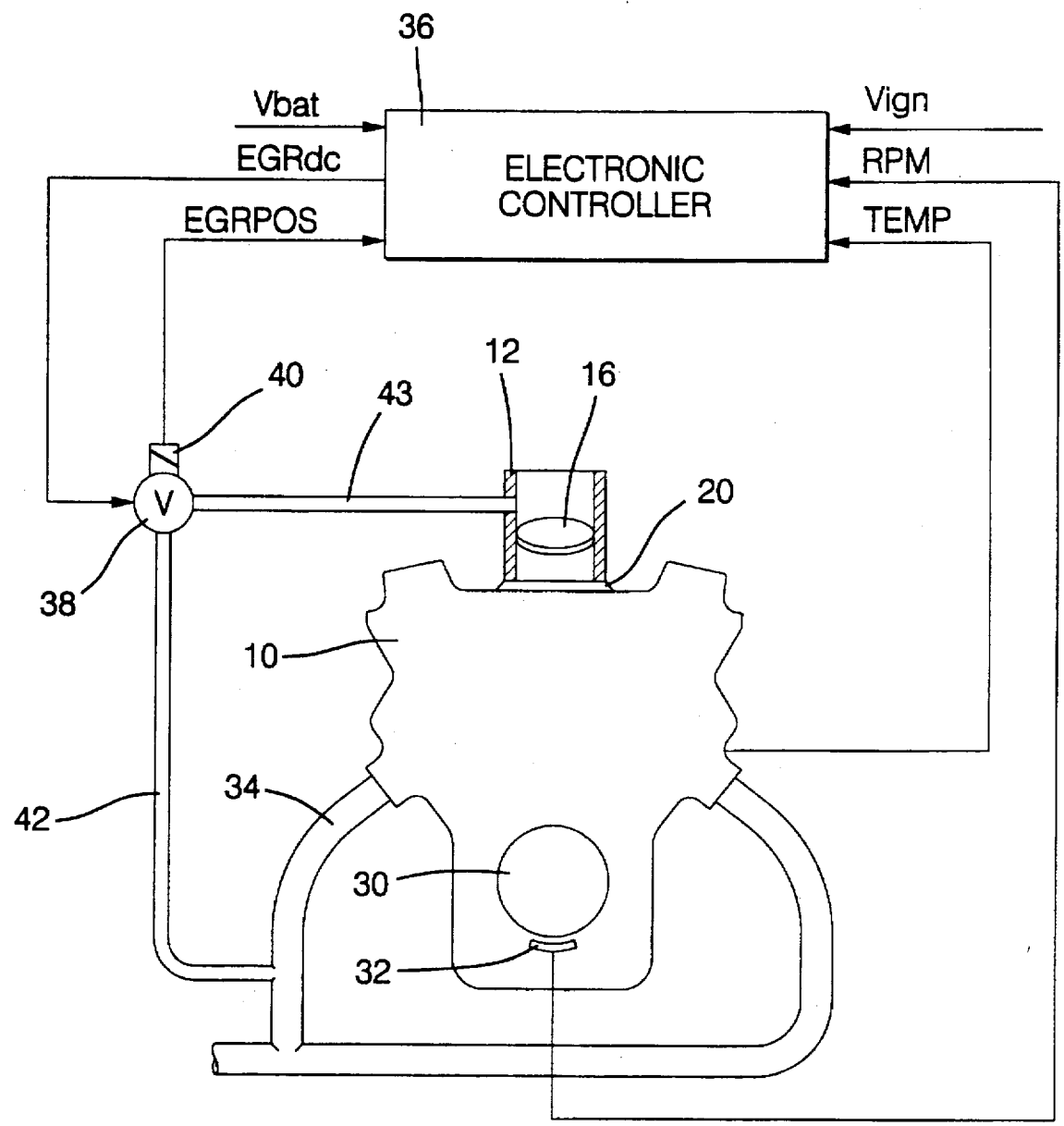
FIG. 1 is a general diagram of an application of an exhaust gas recirculation EGR system with an internal combustion engine and engine control and maintenance hardware for carrying out the preferred embodiment of this invention.

Referring to FIG. 1, four stroke cycle internal combustion engine 10 receives intake air through intake air bore 12 in which is disposed a throttle valve 16 of the butterfly or rotary type for restricting passage of intake air through the bore and into intake manifold 20 for distribution to a plurality of engine cylinders (not shown). The engine 10 includes four cylinders in this embodiment. However, the inventors intend that this invention may be applied to any engine with any number of cylinders. The intake air is combined with a fuel charge and the mixture delivered to the cylinders for combustion therein, the combustion process rotationally driving an engine output shaft 30. The output shaft 30 includes a plurality of aligned teeth or notches (not shown) spaced about its circumference near a shaft end. Seven teeth are provided in this embodiment, six of which are equiangularly spaced about the shaft circumference and a seventh placed in a predetermined synchronization position. A Hall effect or variable reluctance position sensor 32 is disposed on the block of the engine 10 in proximity to the output shaft and aligned with the plurality of teeth or notches to provide for passage of the teeth or notches by the sensor as the output shaft 30 rotates during engine operation. The teeth or notches operate to measurably disrupt a sensor 32 magnetic field when passing by the sensor 32 which disruption is transduced into a sensor analog output signal cycle. The sensor output signal RPM is output by the sensor 32 to indicate output shaft rotation and relative engine position within an engine cycle. Conventional temperature transducer (not shown) in the form of a thermocouple or thermistor is placed in an engine coolant circulation path (not shown) for transducing engine coolant temperature into output signal TEMP.

Combustion in engine cylinders produces gasses which are exhausted out of the cylinders and through exhaust gas conduit 34. A recirculation conduit 42 opens, on a first end, into the exhaust gas conduit 34, and on a second end opposing the first end into the intake air bore 12. A pressure drop between the exhaust gas condition 34 and the intake air bore operates to draw exhaust gas through the recirculation conduit 42 for dilution of the engine fresh air charge, yielding generally known emissions reduction benefits. To ensure a precise exhaust gas recirculation rate, a linear, electronically controlled solenoid valve V 38 is placed in the recirculation conduit 42 between the first and second ends thereof. A control signal EGRdc in the form of a fixed amplitude, variable duty cycle electronic control signal is applied to the valve V 38 to control the position thereof. The signal EGRdc, for the purpose of engine emissions control, is generated through execution of general, commercially available engine control operations.

An electronic controller 36, such as a single chip microcontroller of any conventional architecture is provided for executing, in a step by step manner, instructions stored in non-volatile controller memory devices. Such instruction provide for control, diagnostics and maintenance operations including operations for periodically reading controller input signals, such as the described signals TEMP, RPM, and EGRPOS, and periodically issuing actuator command signals including command signal EGRdc, a fuel command signal for driving engine fuel injectors, ignition control signals for timing ignition of the air-fuel mixture in engine cylinders, and other signals generally understood in the art. A signal Vbat indicating an output voltage level of a vehicle battery (not shown) is provided as an input signal to the electronic controller 36 through a conventional analog to digital converter device having an input range up to about twenty-four volts d.c. Vbat may further be applied as an input to maintain certain memory devices between vehicle ignition cycles. To initiate a vehicle ignition cycle, ignition voltage Vign is manually applied to the controller 36 by a vehicle operator, such as by rotating an ignition key to an "on" position.

Figure 2:
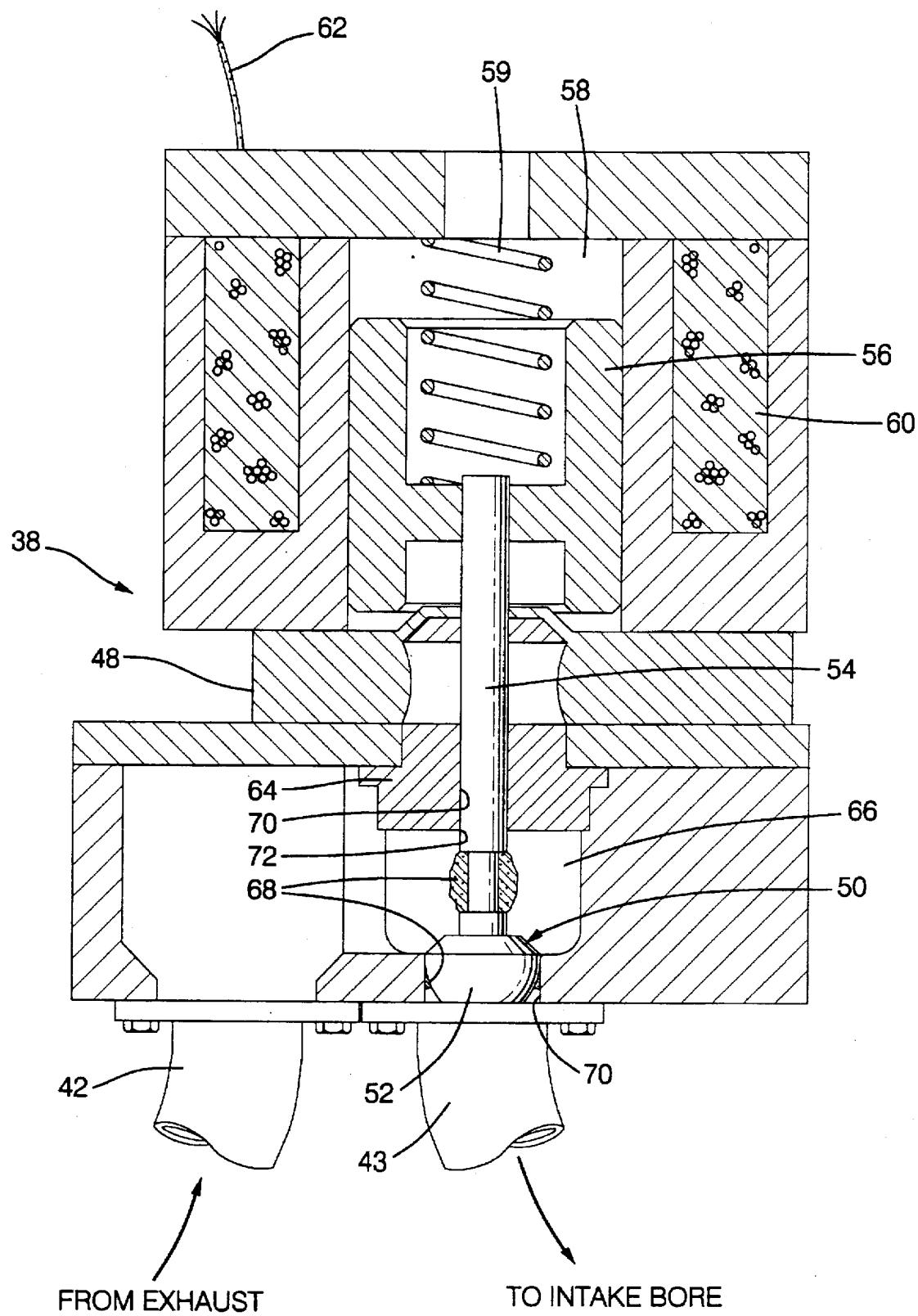
FIG. 2 is a schematic diagram of a linear EGR valve maintained in accord with this embodiment.

Referring to FIG. 2, a cutaway front view of the EGR valve V 38 of FIG. 1 details the pintle 50 including the head 52 and shaft 54 extending through bearing 64 and into cavity 58 in valve housing 48. The shaft 54 is fixedly attached to armature 56 for linear displacement therewith under influence of a magnetic field created by electrical energization of coil 60 via the plurality of coil conductors 62, driven by controller 36 of FIG. 1. Coil spring 59 provides a valve closing force opposed by the magnetic field force, the valve closing force to maintain the pintle in a normally closed position in the absence of significant electrical energization of the coil 60, in which position exhaust gas flow through the valve 38 is prevented. Passage 66 is provided through the housing between the recirculation conduit 42 and the outlet conduit 43. Passage 66 terminates in aperture 70 sized to sealably receive head 52 when the pintle 50 is driven to a fully closed position. Exhaust gas passing through passage 66 deposits contaminants, such as carbon contaminants on the portion of the shaft 54 exposed within passage 66 leading to a buildup of contaminant deposits, generally illustrated as buildup 68, of greater diameter than the inner diameter of bearing 64, eventually restricting or altogether inhibiting pintle 50 movement within the opening 70. Prior to such build-up reaching a level that operates to restrict pintle movement, the maintenance operations in accord with this invention operate to vigorously drive the pintle from its normally closed position to a fully open position, driving the contaminant build-up 68 on shaft 54 through the inner diameter of bearing 64 and scraping, shearing, or jarring such buildup off of the shaft at the point of entry 72 of the shaft 54 into the bearing 64. Further contaminant build-up may occur on pintle head 52 or on aperture 70 which may reduce the sealing relationship of the head 52 and the aperture 70. Rapid engagement and disengagement of the head 52 and aperture 70 in accordance with the maintenance operations of this invention drives of relevant build-up in such areas, improving the seal between the head 52 and the aperture 70.

Figure 3:
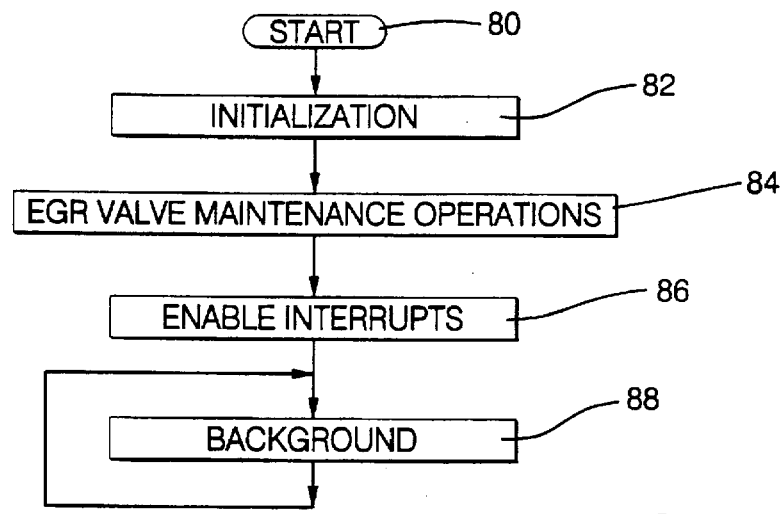
FIGS. 3-5 are flow diagrams illustrating a flow of controller operations for carrying out the EGR valve maintenance operations of this embodiment.
Figure 4:
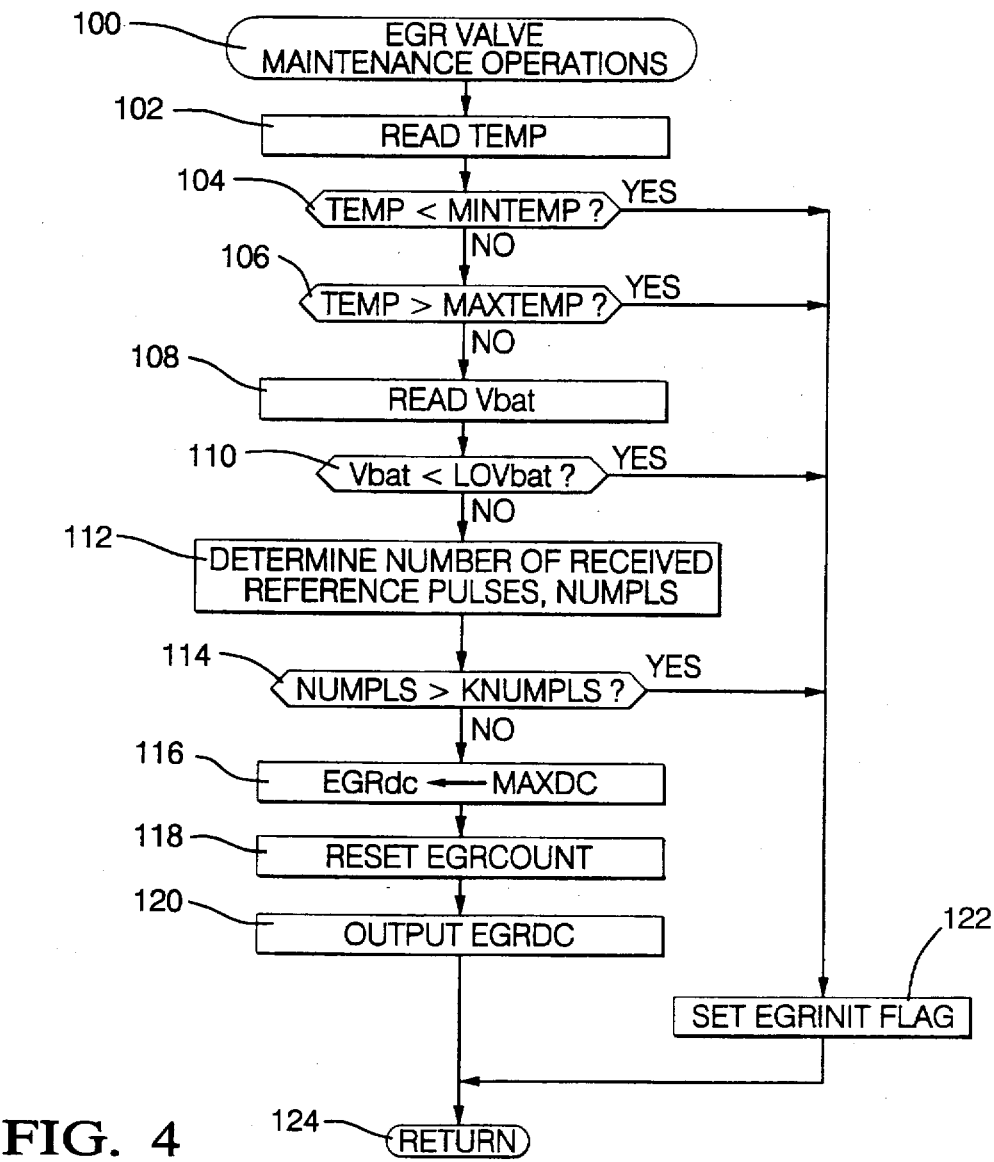
Figure 5:
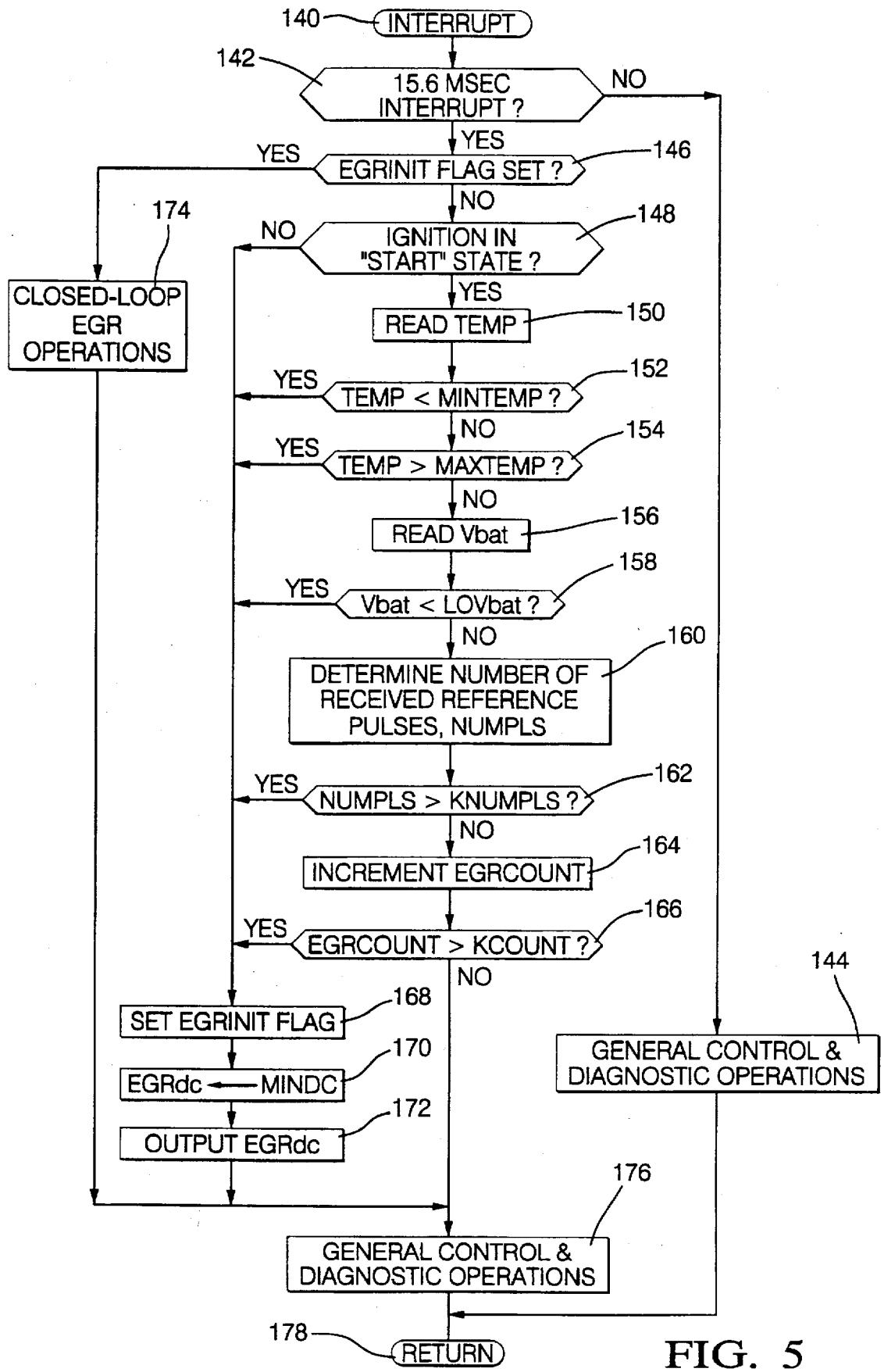

Among the operations carried out by the controller and contributing to EGR valve maintenance in accord with this embodiment are those illustrated in a step by step manner in FIGS. 3-5, which provide for ignition power-up initialization operations, EGR valve maintenance operations, and general control and diagnostic operations in accord with this embodiment. More specifically, startup operations illustrated in FIG. 3 are initiated starting at a step 80 when full ignition voltage Vign is manually applied to the electronic controller 36 (FIG. 1) to take the controller from a disabled state, a wake-up state, or any other state, to a state in which full ignition power is available for controller operations. The flow of operations of FIG. 3, forming a full ignition power-up startup routine, proceed from the step 80 to a next step 82 to provide for system initialization operations, including a resetting of pointers, flags, and counters in the controller 36, and for transfer of data from controller read only memory locations to controller random access memory locations for execution by the controller 36. EGR valve maintenance operations are next initiated by the controller, as illustrated in FIG. 4, starting, when initiated, at a step 100 (FIG. 4) and proceeding to a next step 102 to read a value representing engine coolant temperature, such as the current magnitude of input signal TEMP. TEMP is next compared to a calibrated minimum temperature threshold MINTEMP, typically calibrated at about −40 degrees Celsius in this embodiment, as the temperature below which the EGR valve maintenance operations of this embodiment are not carried out, minimizing vehicle battery drain and maximizing engine startup reliability under conditions of extreme cold. If TEMP is below MINTEMP as determined at the step 104, a flag is set in controller memory, called the EGRINIT flag, at a next step 122, indicating EGR valve maintenance operations are not currently being carried out. The operations of the routine of FIG. 4 are then concluded at a step 124 and the controller then resumes execution of the operations of FIG. 3, at the next step 86, to be described.

Returning to step 104, if TEMP is not less than MINTEMP, it is next compared to MAXTEMP at a step 106. MAXTEMP is calibrated to about 150 degrees Celsius as an extreme high engine coolant temperature above which the EGR valve maintenance operations of this embodiment are not carried out, minimizing vehicle battery drain and maximizing engine startup reliability under extreme high temperature conditions. Further, the electrical resistance of coil 60 (FIG. 2) is likely to be elevated under high temperature operating conditions indicated, for example, by TEMP exceeding MAXTEMP. For the supply voltage available to be applied to the high resistance coil under such conditions, there may be insufficient coil drive force to provide for acceptable coil maintenance, and as such the EGR valve maintenance operations of this embodiment are avoided under such conditions. Specifically, if TEMP exceeds MAXTEMP, the EGR valve maintenance operations of this embodiment are avoided by executing the described step 122 and then the described step 124. Otherwise, input signal Vbat is read at a next step 108, and is compared to a calibrated voltage level, such as about ten volts in this embodiment, at a next step 110. If Vbat is less than LOWVbat, the EGR valve maintenance operations of this embodiment are avoided by executing the described step 122 and then the described step 124. If Vbat is not less than LOWVbat, sufficient EGR valve drive voltage is available to provide for the EGR valve maintenance operations of this embodiment and to provide for other operations, such as startup operations, and a next 112 is executed to determine a number of reference pulses received since the start of the current ignition cycle, maintained in controller memory and labeled NUMPLS. Generally, NUMPLS is cleared at the start of each vehicle ignition cycle, such as at the described step 82 (FIG. 3), and incremented each time one of the six tooth or notches of the crankshaft 30 (FIG. 1) passes the sensor 32 (FIG. 1) indicating rotation of the crankshaft through at most sixty degrees in this embodiment. NUMPLS may be maintained through execution of a crankshaft event service routine designed to be executed following each such tooth or notch passage.

NUMPLS is next compared to KNUMPLS at a step 114. If NUMPLS exceeds KNUMPLS, which is set to one in this embodiment, the EGR valve maintenance operations of this embodiment are not executed, by proceeding to the described step 122 and then to the described step 124. If NUMPLS is less than or equal to KNUMPLS, the EGR valve maintenance operations of this embodiment are carried out by proceeding to set an EGR valve command EGRdc to MAXDC at a step 116. In this embodiment, EGRdc is a duty cycle command and MAXDC is approximately 100 percent duty cycle. The counter EGRCOUNT is next reset to zero at a next step 118, and EGRdc is then output to the valve 38, or to a conventional solenoid drive circuit (not shown) for driving the solenoid with an output current level proportional to the duty cycle represented by the value of EGRdc, at a next step 120. The change in duty cycle command applied to the valve 38 is a step change of significant magnitude, wherein the EGR valve 38 is driven from an initial position, such as a closed position, to a fully open position corresponding to MAXDC in one sudden step, providing for maximum linear pintle velocity to drive the build-up 68 (FIG. 2) through the bearing 64 to jar or shear the build-up away from the shaft 54. After outputting EGRdc, the described step 124 is executed, to return to the operations of the routine of FIG. 3. Such operations resume following the EGR valve maintenance operations, at a step 86, to enable controller interrupts including both time-based interrupts which occur following a prescribed period of time, and event-based interrupts which occur following certain events, such as crankshaft tooth or notch passage events. Upon occurrence of such enabled interrupts, interrupt service routine stored in non-volatile memory of the controller 36 (FIG. 1) are executed, as is generally understood in the art. After enabling such interrupts at the step 86, background operations are repeatedly carried out at a next step 88 including, for example, controller maintenance and diagnostic operations of any conventional form. Such background operations may be temporarily suspended to provide for execution of interrupt service operations following a time or event-based interrupt occurrence.

Referring to FIG. 5, a series of interrupt service operations are illustrated for servicing a time-based controller interrupt. This interrupt is enabled at the described step 86 of the routine of FIG. 3 to occur about every 3.9 milliseconds while the controller is operating. When such interrupt occurs, any prior operations, such as the background operations of FIG. 3, are temporarily suspended and the routine of FIG. 5 is executed beginning at a step 140 and proceeding to a next step 142 to determine if 15.6 milliseconds have elapsed since the last carrying out of the operations of steps 146–176, which generally provide for EGR valve maintenance operations. Such maintenance operations are intended to be carried out about every 15.6 milliseconds or, equivalently, every fourth occurrence of the 3.9 millisecond interrupt. However, the inventors intend that any time interval may be used, as 15.6 milliseconds is chosen solely for convenience in this embodiment.

If 15.6 milliseconds are not determined to have elapsed at the step 142, any general engine control and diagnostic operations required to properly service the current interrupt are next executed at a step 144 including, for example, fuel, air, and ignition control operations and exhaust system diagnostic operations, as are generally known in the art. The service routine of FIG. 5 is then concluded by returning to any prior controller operations via a next step 178. Returning to the step 142, if a 15.6 millisecond interrupt is determined to have occurred, an EGR valve initialization flag EGRINIT is polled at a next step 146. If EGRINIT is set, EGR valve maintenance operations are complete for the current ignition cycle, and closed-loop EGR operations are next activated for normal EGR dilution control operations, such as are generally understood in the art, at a step 174. Any conventional engine control or diagnostic operations required to be carried out for the 15.6 millisecond interrupt, such as general fuel, air, or spark timing control or diagnostic operations are next executed at a step 176, which is followed by the described step 178.

Returning to step 146, if EGRINIT is not set, EGR valve maintenance operations are carried out via steps 148–172. The state of the ignition is first checked at a step 148. If the ignition is not in a "start state" corresponding to application of ignition power to the controller 36 (FIG. 1), then the maintenance operations are concluded by proceeding to set the EGRINIT flag at a next step 168, return the EGRdc command to a minimum command MINDC at a next step 170, and outputting the minimum command to the valve or the driver thereof (not shown) at a next step 172. The described step 176 is then executed. It should be pointed out that although execution of steps 168–172 will prevent execution of the EGR valve maintenance operations of this embodiment because the ignition was determined to be in a state other that the start state, such as a wake-up state, at the step 148, a transition to a start state at any time from the wake-up state or any other such state will result in execution of the described routine of FIG. 3, which may lead to a carrying out of such maintenance operations.

If the ignition is determined at the step 148 to be in the start state, signal TEMP is read at a next step 150 as indicating engine coolant temperature. If TEMP is less than the described MINTEMP at a next step 152, then the EGR valve maintenance operations of this embodiment are concluded by proceeding to executed the described step 168, to minimize vehicle battery drain and to maximize engine startup reliability under conditions of extreme cold. However, if TEMP is not less than MINTEMP at the step 152, then TEMP is next compared to the described MAXTEMP at a next step 154. If TEMP exceeds MAXTEMP, then the EGR valve maintenance operations of this embodiment are not carried out by executing the described step 168, to minimize vehicle battery drain, to maximize engine startup reliability, and to avoid a likely futile energization of a coil with elevated electrical resistance, as described, under the extreme high temperature conditions. Alternatively, if TEMP does not exceed MAXTEMP, input signal Vbat is read at a next step 108, and is compared to a calibrated voltage level LOVbat, such as about ten volts in this embodiment, at a next step 158. If Vbat is less than LOWVbat, the EGR valve maintenance operations of this embodiment are avoided by executing the described step 168. If Vbat is not less than LOWVbat, sufficient EGR valve drive voltage is available to provide for the EGR valve maintenance operations of this embodiment and to provide for other operations, such as startup operations, and a next 160 is executed to determine the described number of reference pulses NUMPLS received since the start of the current ignition cycle. NUMPLS is next compared to KNUMPLS at a step 162. If NUMPLS exceeds KNUMPLS, which is set to one in this embodiment, the EGR valve maintenance operations of this embodiment are concluded by executing the described step 168. If NUMPLS is less than or equal to KNUMPLS, the EGR valve maintenance operations of this embodiment are continued by incrementing EGRCOUNT at a next step 164. EGRCOUNT is a stored counter value indicating the number of 15.6 millisecond intervals during which EGR valve has been driven to a fully opened position corresponding to MAXDC. If, at a next step 166, EGRCOUNT exceeds a calibrated value KCO T, set to 625 ms in this embodiment, then the EGR valve 38 has had sufficient time following the outputting of the command MAXdc at the steps 116 and 120, to fully open, providing a maintenance benefit in accord with this invention, and the maintenance operations are concluded by setting EGRINIT at the step 168, and driving the valve 38 back to a control position, such as an initial closed position via the described steps 170 and 172. Otherwise, if EGRCOUNT does not exceed KCOUNT at the step 166, the EGRdc command is maintained at MAXdc by proceeding directly from step 166 to step 176 without a change in command EGRdc.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. In an internal combustion engine having an engine exhaust gas recirculation path with an electrically controlled recirculation valve therein for controlling the volume of exhaust gas recirculated through the recirculation path, a valve maintenance method comprising the steps of:

sensing an engine power-up condition;

referencing a predetermined valve drive command corresponding to a substantially fully open valve position upon sensing the engine power-up condition;

applying the predetermined valve drive command to the valve upon sensing the engine power-up condition;

sensing a predetermined termination condition; and reducing the predetermined valve drive command toward a predetermined minimum command upon sensing the predetermined termination condition.

2. The method of claim 1, wherein predetermined engine control functions are provided by an engine controller, and wherein the predetermined engine startup condition is sensed when ignition power is applied to the engine controller.

3. The method of claim 1, wherein the predetermined termination condition is an engine cranking condition.

4. The method of claim 1, wherein the predetermined minimum command is a command corresponding to a closed valve position.

5. The method of claim 1, further comprising the steps of:

sensing a parameter indicating engine temperature; and comparing the sensed parameter to a predetermined temperature range;

and wherein the applying step applies the predetermined valve drive command to the valve when the engine power-up condition is sensed and when the sensed parameter is within the predetermined temperature range.

6. The method of claim 1, wherein the engine is electrically driven during at least a predetermined startup period by a battery, the method further comprising the steps of:

sensing a voltage parameter indicating battery voltage; and comparing the sensed voltage parameter to a predetermined threshold voltage;

and wherein the applying step applies the predetermined valve drive command to the valve when the engine power-up condition is sensed and when the sensed voltage parameter is greater than the predetermined threshold voltage.

* * * * *